UNITED STATES PATENT OFFICE.

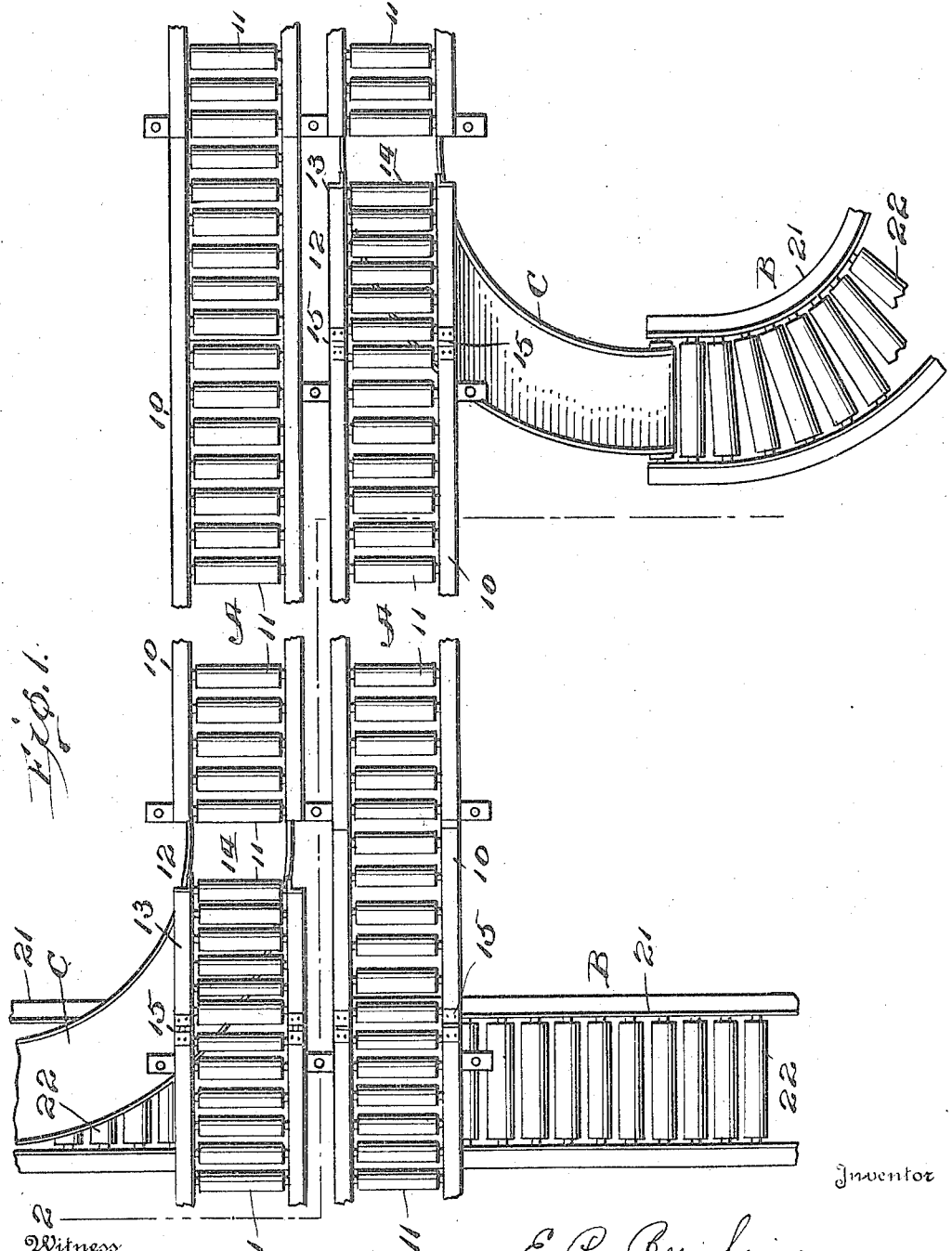

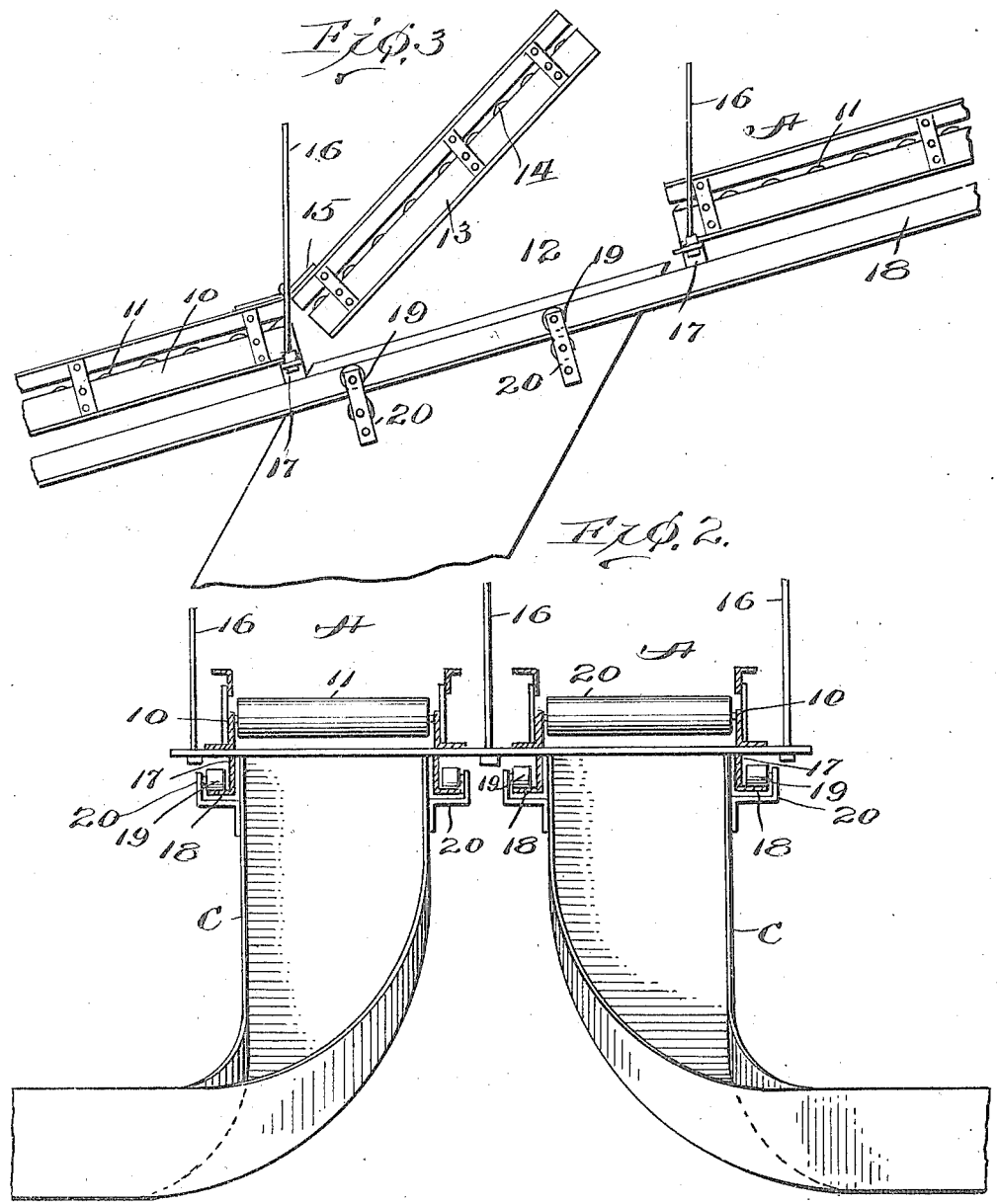

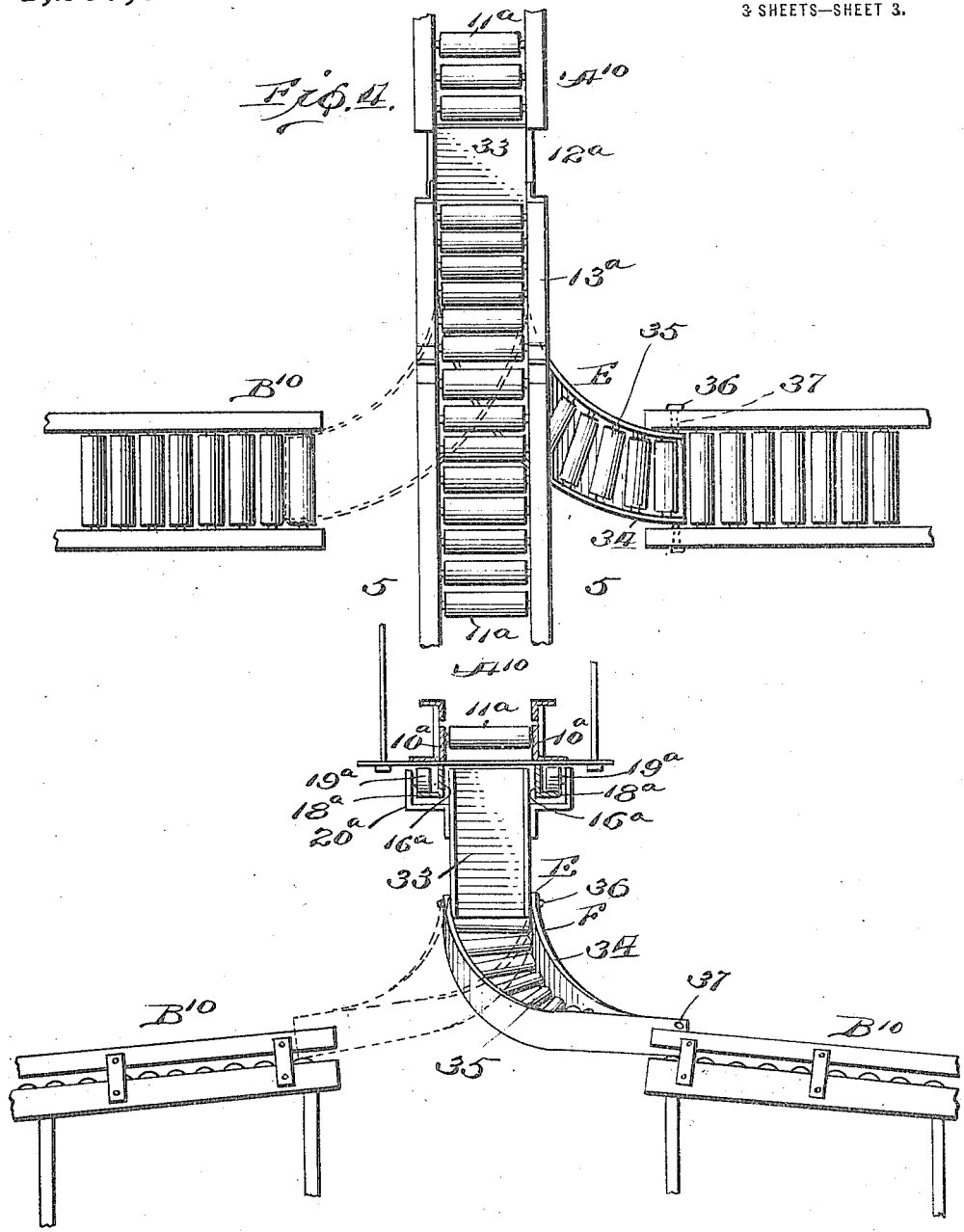

ELBRIDGE PALMER BERNHEIM, OF OAKLEY, OHIO, ASSIGNOR TO THE ALVEY-FERGUSON COMPANY, OF OAKLEY, CINCINNATI, OHIO, A CORPORATION OF OHIO.

MOVABLE CHUTE.

1,267,839.  Specification of Letters Patent.  Patented May 28, 1918.

Application filed July 15, 1915. Serial No. 40,113.

*To all whom it may concern:*

Be it known that I, ELBRIDGE PALMER BERNHEIM, a citizen of the United States, residing at Oakley, in the county of Hamilton and State of Ohio, have invented certain new and useful Improvements in Movable Chutes, of which the following is a specification.

This invention more particularly relates to improvements in that type of gravity conveyers which comprise a supporting frame carrying a multiplicity of rollers arranged to facilitate travel of packages along the conveyer.

One important purpose of the invention is to provide a conveying mechanism having an elevated gravity member which supports a chute mounted to be movable longitudinally of such gravity member with its upper end beneath the bed or way of the latter, the said bed or way being formed in part of independently displaceable sections the displacing of any one of which provides an open hatchway through which the articles being conveyed may drop onto the upper end of the chute positioned therebeneath, it being understood that the chute is movable from one to another of the hatchways.

A further important purpose of the invention is to provide a conveying mechanism wherein provision will be made for delivering articles from one or more upper conveying members to a plurality of lower conveying members which are respectively correlated with different hatchways of the upper member or members, the arrangement being such that the articles may be loaded on the upper member or members at preferred points and suitably delivered to predetermined lower members.

In pursuance of these objects of the invention, I have provided a conveyer which comprises an upper gravity member having parts of its bed displaceable to provide open hatchways at predetermined places, lower gravity members respectively correlated with the hatchways of the upper gravity member and leading, for example, to different places of storage or to loading stations, respectively, and a chute which is supported by the upper gravity member and is movable along the length thereof, so that its upper end may be brought into registration with any one of the hatchways to receive articles therefrom when the section which closes said hatchway is displaced, the lower end of the chute being then in position to discharge the article onto the particular lower gravity member which is associated with said hatchway; whereby the delivery of articles from an elevated place or places to a particular conveyer at a lower level may be conveniently, safely and economically accomplished. In the accompanying drawings I have shown two particularly different mechanisms embodying the structure hereinbefore referred to and which exemplify the practicability of using one or more upper conveying members with one or more chutes movable along the same.

In the drawings:

Figure 1 is a plan view of a double conveyer wherein the improvements contemplated by this invention are embodied.

Fig. 2 is an enlarged section on the irregular line 2—2 of Fig. 1.

Fig. 3 is an enlarged detail side elevation of a part of such a conveyer showing one of the displaceable sections raised and the top of the chute positioned beneath the open hatchway at such point.

Fig. 4 is a detail plan view of another form, exemplifying a single upper conveyer correlated with a delivery chute which may be adjusted to deliver to either side.

Fig. 5 is a section on the line 5—5 of Fig. 4.

In Figs. 1, 2 and 3 which disclose a general arrangement of conveying members embodying the features hereinbefore set forth, there is shown a plurality of upper conveying members A, a plurality of lower conveying members B. The lower members are arranged in series and the members of each series are adapted for connection to a respective upper member A by a shiftable chute C. Each of the conveying members A is provided with longitudinally extending spaced side members 10 carrying freely rotatable rollers 11. The rollers 11 are arranged in spaced sections to provide hatchways 12 at suitable intervals along the members A. Each hatchway is normally closed by a hatch consisting of side members 13 carrying freely rotatable rollers 14. These hatches are independently displaceable to open their respective hatchways. For this purpose, each is preferably pivoted to the lower edge of the respective hatchway openings by means of suitable hinges such as those shown at 15. It will be noted that the bed of each member A is formed in part by the rollers 11 and in part by the rollers 14.

The members A are inclined so that articles placed on the roller beds thereof will move gravitationally along the same. These members A are supported in inclined position by any suitable manner, as, for example, by the hangers 16.

Depending from the members 10 are hangers 17 which serve to support rails 18, illustrated in the present instance as being angle irons. On these rails run rollers 19 which are carried by brackets 20 supporting chutes C. Each of these chutes C is of substantially U-shape in cross section and is preferably so twisted as to have its lower end extending at right angles, or substantially at right angles, to the respective conveying member A. In the present instance it will be seen from Fig. 1 that one of these chutes C extends in one direction from a member A while the other chute C extends from the other member A in a direction opposite to the first chute.

The lower conveying members B are preferably of the ordinary gravity type embodying side rails 21 rotatably supporting conveyer rollers 22.

It is to be noted that any one of the hatches may be opened and when held in its open position by any suitable means, not deemed necessary here to be shown, the open hatch will act to guide articles passing down the conveyer through the hatchway 12. By properly positioning one of the chutes C beneath such hatchway the articles will pass down the chute to the appropriate lower conveying member B, it being observed that the lower conveying members are so positioned as to correlate with respective hatchways. Since the lower end of the chute is preferably arranged at right angles to the upper conveying member it will be obvious that the receiving ends of the conveying members B also are preferably arranged at right angles to the conveying members A, although the members B may be curved in any direction from their receiving ends or may extend in a straight line therefrom.

When the operator desires to send a package or other article from an upper conveying member to any point served by the lower conveying members he selects that upper member which carries the chute feeding the lower member which leads to that point. The appropriate chute is then moved along its rails 18 to position such that it will deliver the package to the proper lower conveying member B. With the chute in this position its upper end will be beneath one of the hatchways 12 and the operator then opens the hatch which normally bridges such hatchway. Any package placed on the upper portion of the conveying member A in which the hatchway has been opened will now pass from the rollers 11 through the hatchway and down the chute, the hatch acting as a stop and when properly positioned assisting in directing the package onto the chute. On arriving at the bottom of the chute the inertia of movement of the package will cause it to pass off the chute onto the particular lower conveying member B to which the chute now leads and passes along said conveying member to the desired point for delivery.

In the form of the device shown in Figs. 4 and 5 there is provided a single upper inclined member $A^{10}$ and a plurality of lower inclined conveying members $B^{10}$. The lower conveying members are similar to the members B in the other exemplified form of the invention and are disposed on opposite sides of the upper member. The upper member consists of longitudinally extending spaced side members $10^a$ carrying rotatable rollers $11^a$, these rollers forming part of the bed of the conveyer. At intervals along the upper member $A^{10}$ hatchways $12^a$ are formed, these hatchways being closed by displaceable hatches $13^a$ which may be similar to those hereinbefore described. The conveying member $A^{10}$ is supported in any suitable manner, as, for example, by hangers $16^a$. Arranged beneath the members $10^a$ are rails $18^a$ which may be similar to the rails 18 and on these rails run rollers $19^a$ which support brackets $20^a$ carrying the upper section 33 of a jointed chute E. This upper section of the chute may be of any desired construction. In the present instance it is illustrated as being an ordinary U-shaped trough. Detachably connected to the upper section of the chute is a lower section which may consist, for example, of the side members 34 supporting the rollers 35, the entire lower section being given a spiral twist and being alike at both ends so that bolts 36 passing through bolt holes 37 may be used to connect the lower section to the upper section. It will be obvious that when one end of the lower section of the chute is connected to the upper section, the lower section will assume a position projecting to one side of the conveying member $A^{10}$, and that when its other end is connected to the upper section the lower section will assume a position projecting to the other side of said conveying member C, these two positions being illustrated in full and dotted lines respectively in Figs. 4 and 5. The lower conveying members $B^{10}$ are so arranged that when the upper portion of the chute E is in position to receive the packages or other articles passing through a definite hatchway, the lower section of the chute E is in position to discharge material onto one of the members $B^{10}$.

In operation, if it be desired to discharge the material from the upper conveying member $A^{10}$ onto a certain lower conveying member $B^{10}$, the lower section of the chute is so connected to the upper section as to project to that side of the conveying member $A^{10}$ on which the particular member $B^{10}$ lies. The proper hatchway is then opened and the chute rolled along the rails $18^a$ until its upper end is in correct position to receive packages dropped through the hatchway, when its lower end will be in position to discharge the packages onto the proper lower conveying member.

It will be obvious that, while there has been shown an arrangement of lower conveying members having their receiving ends at right angles to the upper member from which they receive articles, yet the angles at which these receiving ends extend with relation to the upper members may be varied, the twist given the discharging end of the chute being correspondingly varied.

Having now described the invention what I claim as new and desire to secure by Letters Patent of the United States, is:—

1. A package conveying mechanism, comprising an upper straight downwardly inclined section having its bed formed of freely rotatable rollers on which the packages gravitally move, said section having an interruption in the bed to provide a downwardly open hatchway, a hatch for closing the hatchway, said hatch having freely rotatable rollers which form a part of the bed of the straight section when the hatch is closed and being hinged at one end to open in a direction across the path of the package adjacent the hatchway, and a downwardly extending chute arranged below the gravity section and at an angle to the bed of the latter for conducting to a lower level packages discharged thereinto through the open hatchway, the hatch and chute being so correlated that the hatch when open guides the packages onto the chute.

2. A package conveying mechanism comprising an upper straight downwardly inclined section having its bed formed of freely rotatable rollers interrupted at intervals to provide spaced downwardly open hatchways through which the packages may fall, hatches for closing the respective hatchways, each of said hatches having freely rotatable rollers to form a part of the bed of the straight section when closed and being hinged at one end to open in a direction across the path of the package adjacent the hatchway, and a downwardly extending chute arranged below the gravity section and at an angle to the bed of the latter, and movable longitudinally of said gravity section from one to the other of the open hatchways, at will, for conducting to a lower level packages discharged through the open hatchways, said hatches being so correlated with the chute that when open they guide the packages to the latter.

3. A package conveying mechanism comprising a series of downwardly inclined frame-sections each having a series of freely rotatable rollers journaled in the side members thereof, said sections being spaced from each other, a plurality of other frame sections, each having a series of freely rotatable members journaled in the side members thereof, the latter sections being hingedly mounted in the spaces between confronting ends of the first mentioned sections and the whole constituting a gravity conveyer having its bed formed of freely rotatable rollers certain of which are displaceable to provide downwardly open hatchways, tracks extending longitudinally of the conveyer, portions of the tracks crossing the spaces normally occupied by the displaceable sections, and a suspended chute movable along said tracks and beneath said sections into registration with any one of the hatchways, to receive the packages falling through the latter.

4. A package conveying mechanism, comprising an upper downwardly inclined gravity conveyer having its bed formed of freely rotatable rollers interrupted at intervals to provide spaced downwardly open hatchways through which the packages may fall, displaceable hatches having freely rotatable rollers which form parts of the bed of the conveyer when not displaced, a plurality of lower gravity conveyers, and a chute movable along the upper conveyer and arranged to connect the open hatchways thereof with the lower gravity conveyers, respectively.

5. A package conveying mechanism, comprising an upper downwardly inclined gravity conveyer having its bed formed of freely rotatable rollers interrupted at intervals to provide spaced downwardly open hatchways through which the packages may fall, displaceable hatches having freely rotatable rollers which form parts of the bed of the conveyer when not displaced, a plurality of lower gravity conveyers whose receiving ends are arranged at angles to the axis of the upper gravity conveyer, and a chute movable along the upper gravity conveyer and twisted between its ends to connect the open hatchways of the upper conveyer with the lower gravity conveyers, respectively.

6. A conveying mechanism comprising an upper conveying member having a bed provided with displaceable hatches which when not displaced form parts of the bed of the member, a chute supported beneath and movable along the conveying member to selected positions beneath the respective hatches, the chute being provided with a reversible curved lower end adapted to deliver material at either side of the upper conveying member, and lower conveying members arranged on opposite sides of the upper conveying member in position to receive material from the lower end of the chute when the upper end is beneath the hatchway.

7. A conveying mechanism comprising an upper conveying member having a bed provided with displaceable hatches which when not displaced form parts of the bed of the member, a chute supported beneath and movable along the conveying member to selected positions beneath the respective hatches, the chute being provided with a reversible curved lower end adapted to deliver material at either side of the upper conveying member, and lower conveying members arranged in pairs oppositely disposed on opposite sides of the upper conveying member and extending substantially at right angles to the upper member, the lower members being disposed to receive material delivered from the chute.

In testimony whereof I affix my signature in the presence of two witnesses.

ELBRIDGE PALMER BERNHEIM.

Witnesses:
RUSSELL L. COOK,
E. A. GARTTMAN.

Copies of this patent may be obtained for five cents each, by addressing the "Commissioner of Patents, Washington, D. C."